April 10, 1951     J. DOLEJS     2,548,291
FISHING SINKER
Filed Aug. 16, 1947

INVENTOR
JOSEPH DOLEJS
BY Wheeler, Wheeler & Wheeler
ATTORNEYS

Patented Apr. 10, 1951

2,548,291

UNITED STATES PATENT OFFICE 2,548,291

FISHING SINKER

Joseph Dolejs, Antigo, Wis.

Application August 16, 1947, Serial No. 769,025

6 Claims. (Cl. 43—44.88)

This invention relates to improvements in fishing sinkers.

The object of the invention is to provide a fishing sinker readily engageable with, and detachable from, and freely adjustable along, a fishing line, without injury to the line.

In this connection it is a particular object of the invention to provide unitarily a combined line guide and binder which may be, in manufacture, cast in the sinker body in one simple operation.

A novel feature of the invention is the provision made for securing the line to the sinker by frictionally binding it between the sinker body and one of a variety of line binders to be hereinafter described.

Other objects will be apparent to those skilled in the art upon examination of the following disclosure.

In the drawings:

Figs. 1 to 5 show one embodiment of the invention comprising a sinker body 6, which may be of lead or like material, provided at its outer surface with a line guide and a line binder.

The line guide has the general form of a broad staple and consists of a bar 7 extending longitudinally of the sinker body and elevated thereabove by end portion or posts 8 and 9 integral with the bar 7 and embedded in the body, so as to provide a space between the bar and the body to admit the bight 10 of a fishing line 11.

Figure 1:
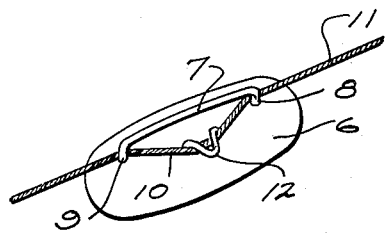
Fig. 1 is a view in perspective of one form of the sinker with a line engaged therewith.
Figure 2:
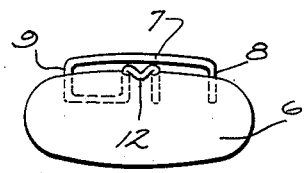
Fig. 2 is a view in side elevation of the sinker shown in Fig. 1.
Figure 3:
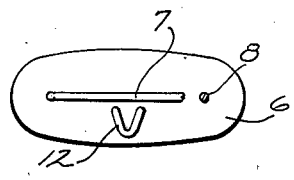
Fig. 3 is a plan view of the sinker with a guide post shown in section.
Figure 4:
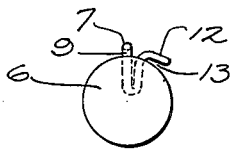
Fig. 4 is a view in end elevation of the sinker shown in Fig. 1.

The line binder consists of a hook 12 positioned approximately midway of the extremities of the line guide, laterally offset therefrom and from the same surface of the body from which said bar is spaced intermediate said end portions, and merging with other portions of the staple extending at an acute line-wedging angle with the body and away from the line guide so as to form a wedge-shaped recess 13, as best shown in Fig. 4, into which the bight 10 of the fishing line 11 may be frictionally bound.

It is apparent that the line may be readily attached to the sinker by merely looping a bight of the line through the guide, over the hook-like formation, and tensioning the line to draw the bight into binding engagement between the hook and the sinker body. When the line is thus positioned, the weight of the sinker will keep the line taut, and the posts 8 and 9 will prevent the disengagement of the line from the binder. The line may be detached from the sinker by reversing the aforementioned procedure.

Figure 5:
Fig. 5 is a detailed view of the unitary line guide and binder before being cast with the sinker body.

As best shown in Fig. 5, the line guide and line binder are unitarily fabricated of a single piece of wire, a strand 90 of which connects post 9 of the guide to one leg of the hook. Strand 90 and part of post 9 and parts of both legs of the hook are embodied in the cast body. The construction greatly simplifies the manufacture of the completed sinker by requiring only one part to be cast into the sinker body. In the preferred form of construction, in which the guide and binder are formed from a single piece of wire, the surfaces are rounded and thus will not abrade or wear the fishing line.

Figure 6:
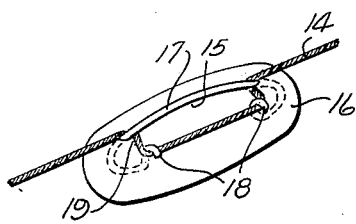
Fig. 6 is a perspective view of an alternate form of the invention.
Figure 7:
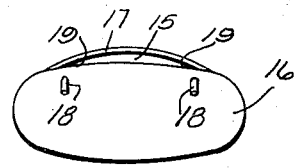
Fig. 7 is a view in side elevation of the sinker shown in Fig. 6.

An alternate form of the invention is shown in Figs. 6 and 7 wherein the binder is staple-shaped and the guide comprises a hook-like formation projecting from the same body surface. Here the bight of a line 14 may be looped through the aperture 15, formed between the sinker body 16 and the staple bar portion 17, the ends of which are embedded in the body, approaching it at a line-wedging angle. The line is passed around the spaced hooks 18 and wedged into the sharply acute angles 19 formed between the sinker body surface and the staple bar 17. In this form also the binder and guide are unitary so as to facilitate manufacture.

I avoid all moving parts by engaging the line between the fixed binder and sinker body, utilizing largely the resilience of the line itself. In this manner, the useful life of the sinker is extended.

I claim:

1. In a fishing sinker, the combination with a sinker body, of a rail having a longitudinal portion spaced from the body and terminals embedded in the body, and a hook formation projecting from the body intermediate the ends of the longitudinal portions of the rail, spaced laterally from the longitudinal portion of the rail, the hook formation having a cavity facing away from the longitudinal portion of the rail, whereby the bight of a line may be passed between the longitudinal portion of the rail and body to engage the hook formation within its cavity, the bight of the line, when so engaged, being disposed on a non-rectilinear path respecting adjacent portions of the line as defined by the terminals of the rail and the hook formation.

2. The device of claim 1 wherein the longitudinal portion of the rail and hook are unitary and have integral connecting and supporting portions molded within the sinker body.

3. The combination with a sinker body of a staple, said staple having a longitudinal portion and transverse portions at the ends of the longitudinal portion, the transverse portions being embedded in the body and at least one of the transverse portions having a terminal intermediate the ends of the longitudinal portion and provided with a hook formation spaced laterally from the longitudinal portion with the cavity of the hook portion having a section thereof facing outwardly from the body and away from the longitudinal portion, whereby a line may be passed around the ends of the longitudinal portion and within the cavity of the hook formation.

4. In a fishing sinker, a sinker body, a staple having a bar spaced from one surface of the body and end portions embedded therein, said staple having a hook-like formation spaced laterally from the bar and from the same surface and having portions embedded in the body, certain of said embedded portions merging with other portions at an acute line-wedging angle from said surface of the body, whereby a fishing line bight extending under the bar and about the hook-like formation will be wedged between the body and said last portions to releasably fix the sinker to the line.

5. The device of claim 4 wherein the portions of said staple at an acute line-wedging angle respecting the said body surface comprise portions of said bar immediately adjacent the embedded end portions thereof.

6. A fishing sinker comprising a body and a bar, said bar including a line guide portion and a line binder portion constituting a unitary single piece of wire having portions embedded in the body and other portions projecting therefrom, one of the portions projecting from the body defining a hook-like formation and another projecting portion defining a length of the wire spaced from the surface of the body with its ends emerging from the embedded portions, whereby a line may be passed around the emerging portions on one side of the length portion and be wedgingly engaged at another side of the length portion with the hook-like formation, the hook-like formation being located between the ends of the length portion.

JOSEPH DOLEJS.

REFERENCES CITED

The following references are of record in the file of this patent:

UNITED STATES PATENTS

| Number | Name | Date |
|---|---|---|
| 1,608,662 | Nourse | Nov. 30, 1926 |
| 1,632,502 | Peckham | June 14, 1927 |
| 2,257,415 | Gerdin | Sept. 30, 1941 |